United States Patent [19]

Ellingson

[11] Patent Number: 4,691,957
[45] Date of Patent: Sep. 8, 1987

[54] ROLL-TIGHT TARP SYSTEM

[75] Inventor: Hartley Ellingson, Wahpeton, N. Dak.

[73] Assignee: Frontier, Inc., Wahpeton, N. Dak.

[21] Appl. No.: 904,800

[22] Filed: Sep. 8, 1986

Related U.S. Application Data

[63] Continuation of Ser. No. 725,658, Apr. 22, 1985, abandoned, which is a continuation of Ser. No. 476,118, Mar. 17, 1983, abandoned.

[51] Int. Cl.$^4$ .......................... B60P 7/04; B65D 43/26
[52] U.S. Cl. ...................................... 296/98; 160/243; 160/290 R; 135/903; 135/DIG. 5; 220/262; 220/314; 196/100
[58] Field of Search ................... 725/658; 296/98, 100, 296/141, 143; 160/265, 290 R, 243, 389, 400; 135/903, DIG. 5; 220/211, 260, 262, 314; 298/23 C

[56] References Cited

U.S. PATENT DOCUMENTS

| | | | |
|---|---|---|---|
| Re. 31,746 | 11/1984 | Dimmer et al. | 296/98 |
| 1,318,820 | 10/1919 | Watkins | 160/121 R |
| 1,459,155 | 6/1923 | Ioor | 160/389 |
| 1,538,384 | 5/1925 | Crockett et al. | 296/102 |
| 1,786,048 | 12/1930 | Williams | 105/377 |
| 2,230,908 | 2/1941 | Reiman | 160/264 |
| 2,465,621 | 3/1949 | Wheeler | 24/72.5 |
| 2,591,186 | 4/1952 | Neitzke | 160/DIG. 2 |
| 2,594,910 | 4/1952 | Germann | 160/DIG. 2 |
| 2,743,132 | 4/1956 | Zahn | 296/100 |
| 2,976,082 | 3/1961 | Dahlman | 296/98 |
| 3,024,063 | 3/1962 | Robinson | 296/100 |
| 3,044,653 | 7/1962 | Tantlinger | 105/377 |
| 3,052,498 | 9/1962 | Lessing et al. | 296/100 |
| 3,066,974 | 12/1962 | Ambli | 296/100 |
| 3,146,824 | 9/1964 | Veilleux | 296/98 |
| 3,168,345 | 2/1965 | Roberts et al. | 296/100 |
| 3,292,971 | 12/1966 | Zucker | 49/361 |
| 3,326,597 | 6/1967 | Barker | 135/88 |
| 3,384,413 | 5/1968 | Sargent | 296/98 |
| 3,397,009 | 8/1968 | Landenberger | 105/377 |
| 3,423,126 | 1/1969 | Galvin et al. | 296/98 |
| 3,494,658 | 2/1970 | Maes, Jr. | 296/100 |
| 3,498,666 | 3/1970 | Harrawood | 296/98 |
| 3,667,802 | 6/1972 | Love | 296/98 |
| 3,692,354 | 9/1972 | Tuerk | 52/281 |

(List continued on next page.)

FOREIGN PATENT DOCUMENTS

| | | |
|---|---|---|
| 965454 | 4/1975 | Canada . |
| 1132168 | 9/1982 | Canada . |
| 1134411 | 10/1982 | Canada . |
| 809136 | 7/1951 | Fed. Rep. of Germany ...... 296/100 |
| 1010702 | 6/1952 | France . |
| 500368 | 11/1954 | Italy . |
| 693979 | 7/1953 | United Kingdom . |

OTHER PUBLICATIONS

Frontier Convert-A-Tarp, drawings and installation instructions.
Poor Man's Roll Over Tarp—Behee Upholstery & Canvas, Ft. Dodge, Kansas, also Poor Man's Side Roll Tarps—Behees, Inc.
Edwards Canvas Inc., brochure—"Roll-Over Covers", Pauls Valley, Oklahoma.
Brochure, Frontier, Inc., "Only at Frontier Convert-A-Tarp".
Copy of advertisement, Wahpeton Daily News, Oct. 30, 1981.
Brochure, Rainbow Industries, Inc., "Rol-Top Gravity Wagon Covers".
Catalog, Aero Industries, Inc.
Koffler Manufacturing, Inc., brochure, "Koffler's Sidewinder Econo Truck Tarp".

Primary Examiner—Dennis H. Pedder
Attorney, Agent, or Firm—Burd, Bartz & Gutenkauf

[57] ABSTRACT

A tarp assembly for covering an open top of a truck trailer has a tarp with a longitudinal edge fixed to one side of the trailer. A roll bar secured to the free edge of the tarp is rotated with a crank rod to roll the tarp to an open position and unroll the tarp to a closed position. A hold bar fixed to the free edge of the tarp with a plurality of straps is adapted to engage hooks secured to a side of the trailer to hold the tarp in a closed position. The hooks guide the straps and retain the hold bar in alignment for mutual engagement with the hooks.

31 Claims, 14 Drawing Figures

U.S. PATENT DOCUMENTS

| | | | |
|---|---|---|---|
| 3,785,694 | 1/1974 | Sargent | 296/98 |
| 3,829,154 | 8/1974 | Becknell | 160/23 R |
| 3,854,770 | 12/1974 | Grise et al. | 296/98 |
| 3,942,830 | 3/1976 | Woodard | 296/100 |
| 3,977,719 | 8/1976 | Thurston | 294/19 R |
| 4,014,590 | 3/1977 | Schulz, Jr. | 296/100 |
| 4,030,780 | 6/1977 | Petretti | 160/67 |
| 4,050,734 | 9/1977 | Richard | 296/98 |
| 4,212,492 | 7/1980 | Johnsen | 296/98 |
| 4,225,175 | 9/1980 | Fredin | 160/68 |
| 4,234,224 | 11/1980 | Rosenvold | 296/98 |
| 4,302,043 | 11/1981 | Dimmer et al. | 296/98 |
| 4,484,777 | 11/1984 | Michel | 296/98 |
| 4,505,512 | 3/1985 | Schmeichel et al. | 296/98 |

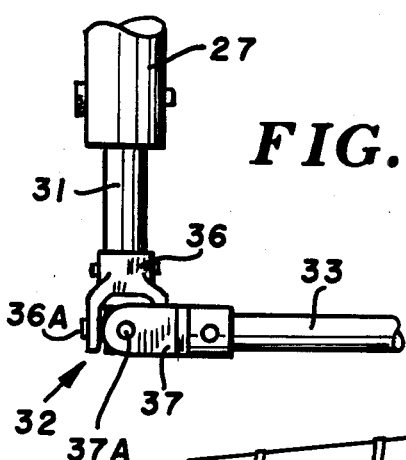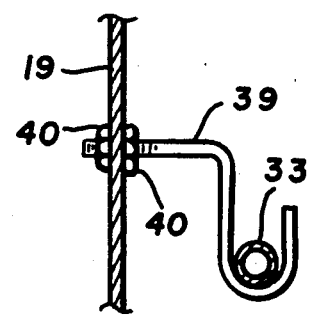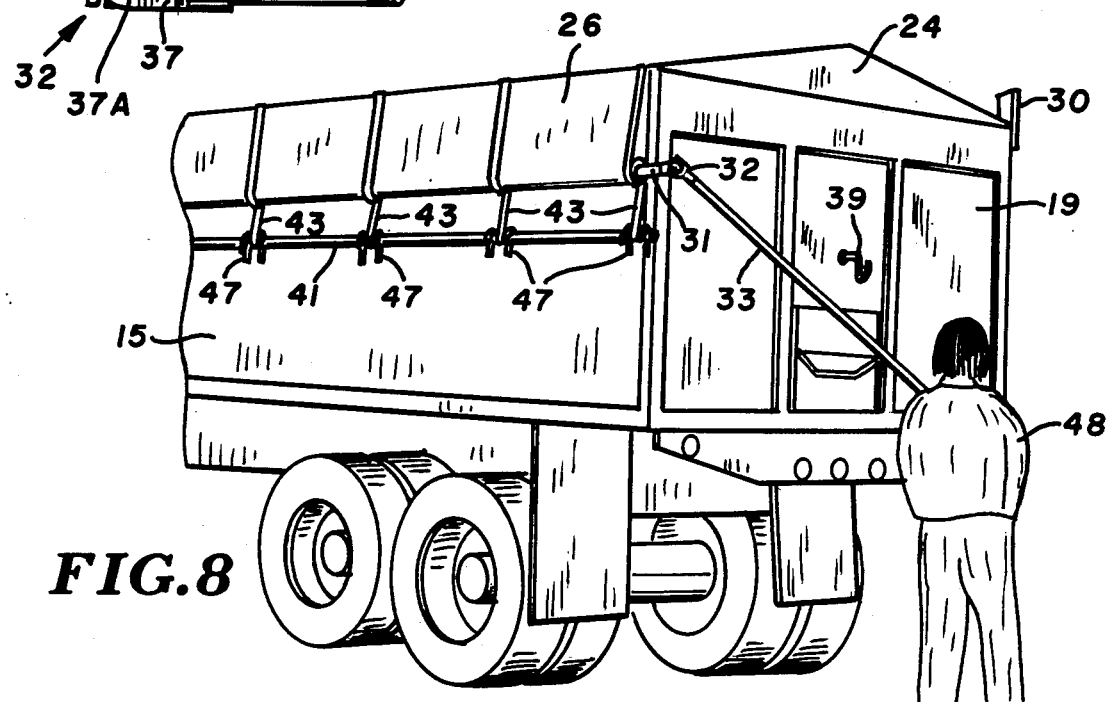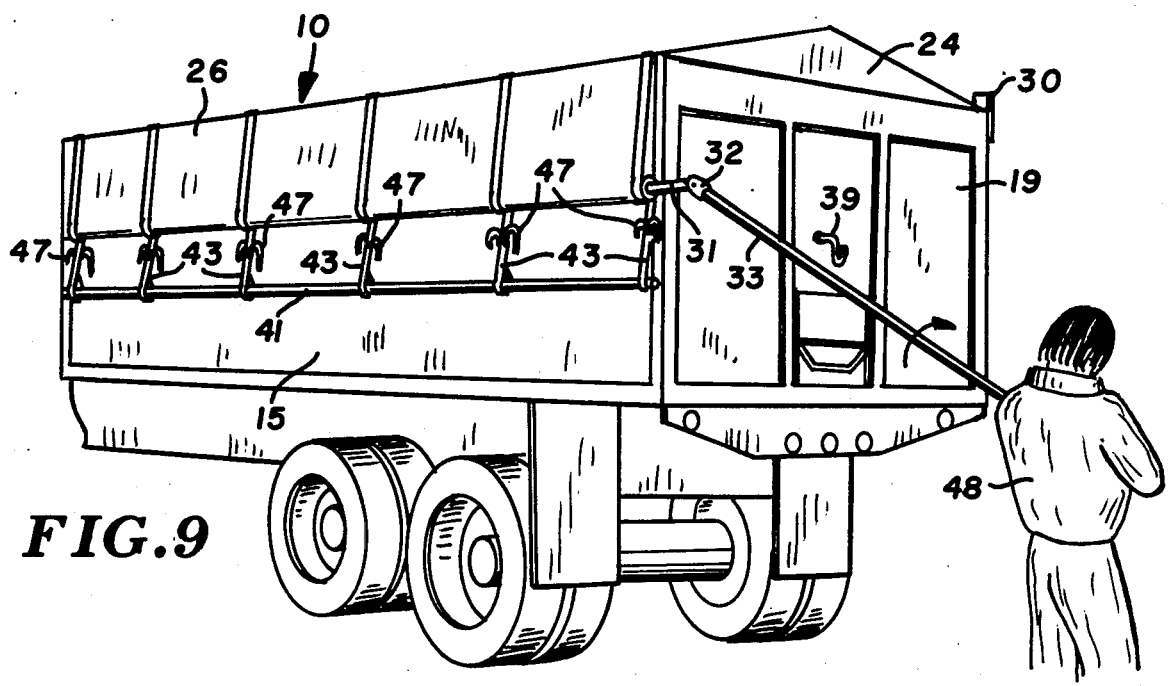

ROLL-TIGHT TARP SYSTEM

This application is a continuation of Application Ser. No. 725,658 filed Apr. 22, 1985, now abandoned. Application Ser. No. 725,658 is a contination of Application Ser. No. 476,118 filed Mar. 17, 1983, now abandoned.

FIELD OF THE INVENTION

The invention relates to removable covers for containers. More particularly, the covers are flexible tarps used to cover open top truck boxes and trailers.

BACKGROUND OF THE INVENTION

Tarp assemblies are used to cover open top containers such as an open top truck box or truck trailer used in transport of granular material, hard goods and the like. The open top box or trailer has characteristics of economy of construction and ease of loading and unloading certain commodities but lacks the measure of protection afforded by a structurally enclosed truck trailer. Accordingly, tarp assemblies include a tarp for removably covering the top of the open top trailer to protect the contents thereof during transport or simply during storage. For aerodynamic considerations, the tarp is preferably tight fitting. Due to the size of the box and the tarp, preferably means are provided to simplify the covering and uncovering procedures permitting them to be accomplished by a single individual standing at ground level in a relatively short period of time.

SUMMARY OF INVENTION

According to the present invention, there is provided a tarp assembly useable to cover an open top, box-like container or box such as a truck trailer having longitudinal sidewalls and top edges, and transverse forward and rearward walls and top edges. The tarp assembly includes an elongate sheet-like tarp having one longitudinal edge fixed adjacent an upper longitudinal edge of one of the box sidewalls. The other longitudinal tarp edge is extendable over the opposite longitudinal edge of the box sidewall with the tarp in covering relationship to the top opening of the box. The tarp is rolled and unrolled on a roll bar by rotation of a crank rod connected at one end to the end of the bar by a universal joint. An elongated elastic cord connected to the roll bar and box facilitates the unfurling or closing of the tarp. When the crank rod is disposed in perpendicular relationship to the roll bar, the universal joint is locked and the roll bar cannot be rotated. A separate, releasable holding structure comprising a hold bar is fixed to the free edge of the tarp and the roll bar by a plurality of straps. The hold bar is engageable and disengageable with hook means located on the box sidewall. The hook means comprise a plurality of inverted U-shaped hook members mounted on the midsection of the box sidewall. When the hold bar is released from the hook members, the crank rod can be rotated to roll the tarp on the roll bar. The elastic cord is elongated as the roll bar moves to the open position. In the unfurling or closing procedure, the roll bar is rotated by rotation of the crank rod in a direction such that the tarp progressively covers the top opening of the trailer. The elongated elastic cord pulls the end of the roll bar opposite the universal joint to aid in closing the tarp. Upon reaching the opposite longitudinal box edge, the roll bar is rotated to continue unfurling the tarp until it is completely unrolled and the hold bar hangs by the straps from the movable edge of the tarp. The roll bar is continually rotated to the point where the tarp is rolled up oppositely on the roll bar and the straps are lifted to a point where the hold bar is engaged with the hook members to securely tighten the tarp in place. The roll bar is then locked by positioning the crank rod in a suitable holder at a right angle to the roll bar in order to disable the universal joint and prohibit further rotation of the bar. Upon rolling of the tarp cover, the reverse procedure is employed.

IN THE DRAWING

FIG. 6 is an enlarged view of the universal joint between the roll bar and crank rod as shown in FIG. 3 and taken along the line 6—6 thereof;

FIG. 7 is an enlarged sectional view of another portion of the truck trailer and crank rod shown in FIG. 3 taken along the line 7—7 thereof;

FIG. 8 is a perspective view of the rear portion of the truck trailer of FIG. 1 preparatory to commencement of the tarp-rolling procedure;

FIG. 9 is a perspective view of a portion of the truck trailer of FIG. 1 at a first intermediate point in the tarp-rolling procedure;

DESCRIPTION OF A PREFERRED EMBODIMENT

Figure 1:
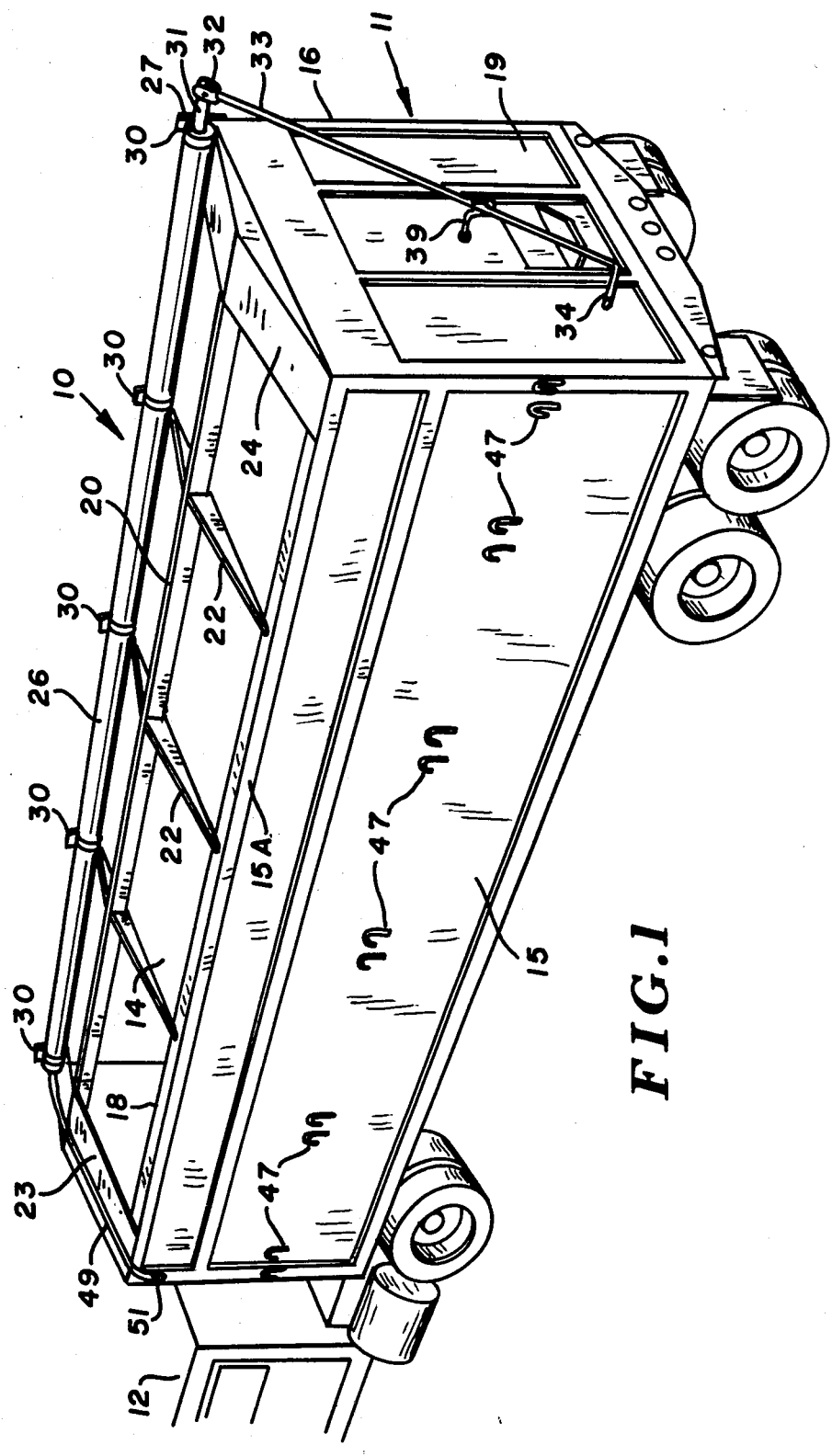
FIG. 1 is a perspective view of an open top truck trailer equipped with a tarp assembly according to the invention in the furled or open rolled-up configuration.
Figure 2:
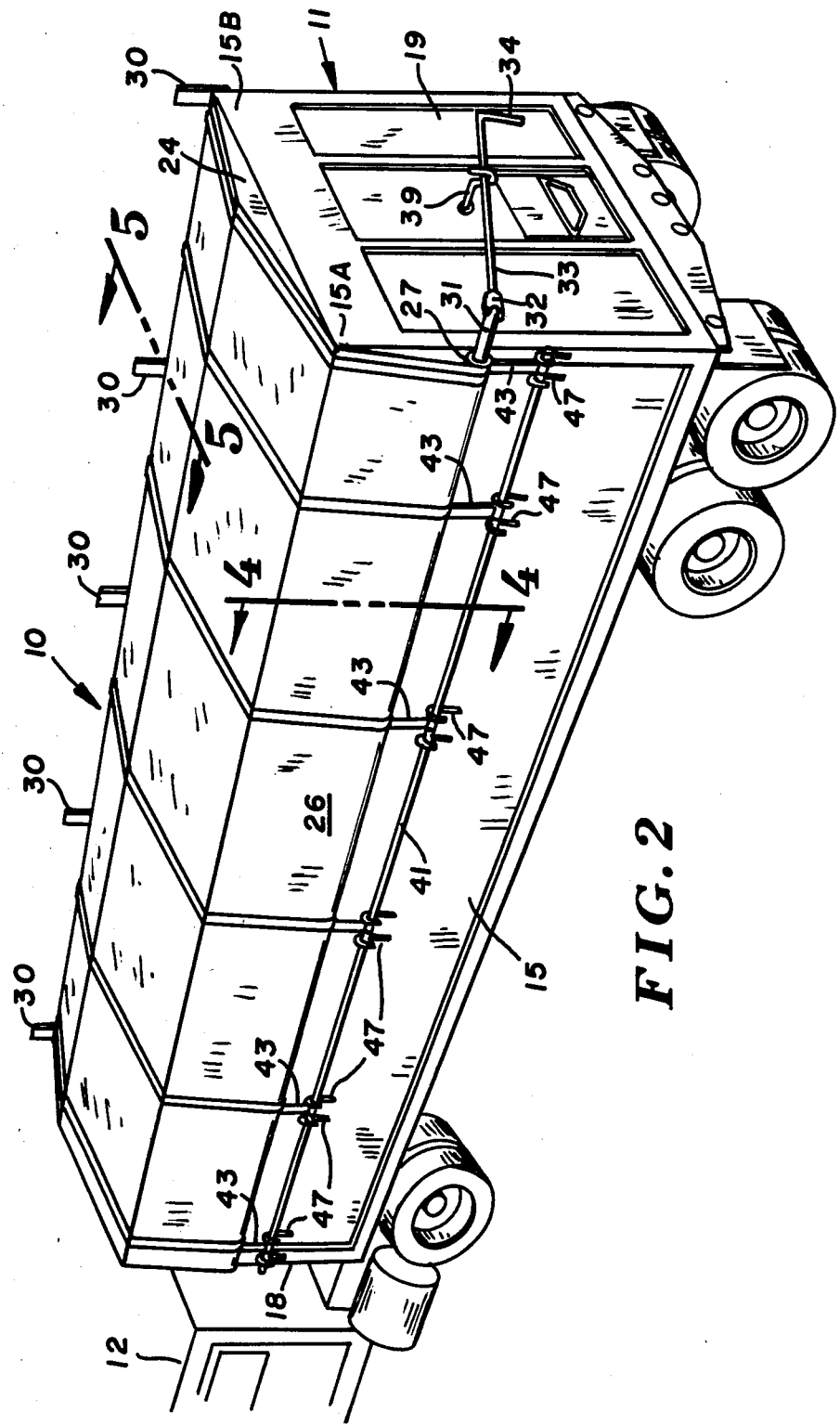
FIG. 2 is a perspective view of the open top truck trailer of FIG. 1, but showing the tarp assembly in the unfurled or closed unrolled configuration.

Referring to the drawing, there is shown in FIGS. 1 and 2 a tarp assembly indicated generally at 10 installed on a box-like, longitudinally elongate open top truck trailer 11 of the type towed by an over-the-road truck tractor partially shown at 12. Tarp assembly 10 is shown in FIG. 1 in an open position with the tarp being in a rolled or furled configuration with respect to top opening 14 of trailer 11, and in FIG. 2 in the unrolled or unfurled configuration in covering relationship to top opening 14.

Truck trailer 11 is the type used to carry bulk material or the like, such as corn, wheat, sunflower seeds and barley that is loaded through top opening 14. Trailer 11 has elongate left and right longitudinal sidewalls 15, 16 having longitudinal upper box beams or edge members 15A and 16A and transverse front and rear walls 18, 19. The walls 15, 16, 18 and 19 extend upwardly from a floor or bed (not shown). An example of an open top truck body is shown in U.S. Pat. No. 3,804,464. An elevated longitudinal ridge member 20 extends centrally between front and rear walls 18, 19 and is connected by transverse bows or stringers 22 to sidewalls 15, 16. Forward and rearward ramps or caps 23, 24 extend from the forward and rearward ends of sidewalls 15, 16 to ridge member 20 adjacent the upper edges of the forward and rearward sidewalls 18, 19.

Figure 5:
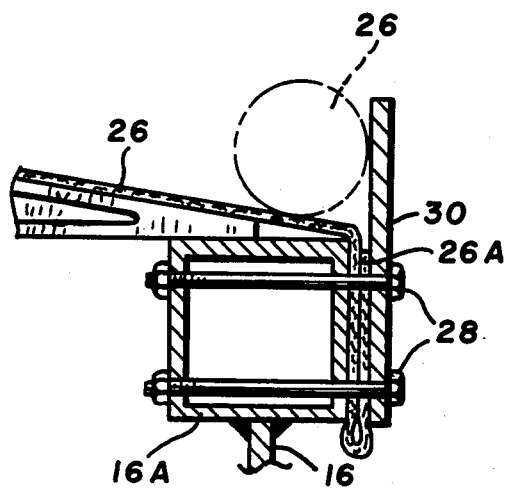
FIG. 5 is an enlarged sectional view of another portion of the truck trailer of FIG. 2 taken along the line 5—5 thereof.

Tarp assembly 10 includes a sheet-like tarp 26 having a length substantially equal to that of trailer 11 and formed of a suitable, pliable, durable and water-repellent material, such as canvas or reinforced sheet plastic. For example, tarp 26 can be a vinyl impregnated nylon that is flame and tear resistant. Tarp 26 is wound and unwound on an elongate, winding core member or roll bar 27. One longitudinal edge of tarp 26 is fixed adjacent the upper sidewall edge member 16A, as shown in FIG. 5. An overlapped edge 26A of tarp 26 is situated adjacent the upper box beam or edge member 16A. Nut and bolt assemblies 28 extend through an upstanding tarp stop member 30, then through the edge 26A of tarp 26 and through the tubular side edge member 16A. A plurality of tarp stop members 30 are positioned along the length of upper edge member 16A and serve to limit movement of roll bar 27 with tarp 26 wound thereon. Members 30 are upright bars secured to beam 15B. The movable longitudinal edge of tarp 26 is formed into a sewn loop 26B that accommodates roll bar 27 (see FIG. 14).

Returning to FIGS. 1 and 2, a linear extension 31 extends rearwardly from roll bar 27 and is connected by a universal joint 32 to one end of a crank rod 33. Crank rod 33 terminates in an angular handle 34 at the lower or end opposite universal joint 32. Crank rod 33 is movable to a position having a linear component axially aligned with roll bar 27, whereby axial rotation of crank rod 33 results in axial rotation of roll bar 27 to wind and unwind tarp 26 thereon. As shown in FIG. 6, universal joint 32 includes a first bifurcated yoke 36 located on the end of extension 31 of roll bar 27, and a second bifurcated yoke 37 located on the end of crank rod 33. First and second yokes 36, 37 are connected by suitable pins 36A and 37A, whereby crank rod 33 is pivotally movable with respect to outward extension 31. In the perpendicular or 90° configuration shown in FIG. 6, universal joint 32 is locked. Rod 33 functions as an elongated lever to rotate roll bar 27 to tighten the tarp 26. When crank rod 33 is held in a fixed position, roll bar 27 is prevented from axially rotating.

A rod-holding bracket constituted as an upwardly open hook 39 is centrally fastened to rear wall 19 to hold crank rod 33 when in perpendicular relationship to roll bar 27 when tarp 26 is in a completely furled or completely unfurled configuration. As shown in FIG. 7, hook 39 has a linear shank extended through rear wall 19 and secured by a pair of nuts 40.

Figure 4:
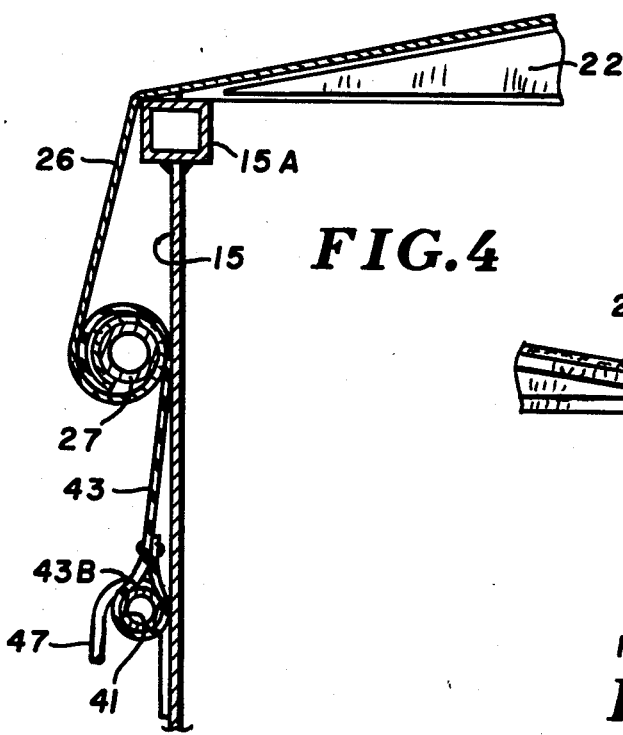
FIG. 4 is an enlarged sectional view of a portion of the truck trailer of FIG. 2 taken along the line 4—4 thereof.
Figure 13:
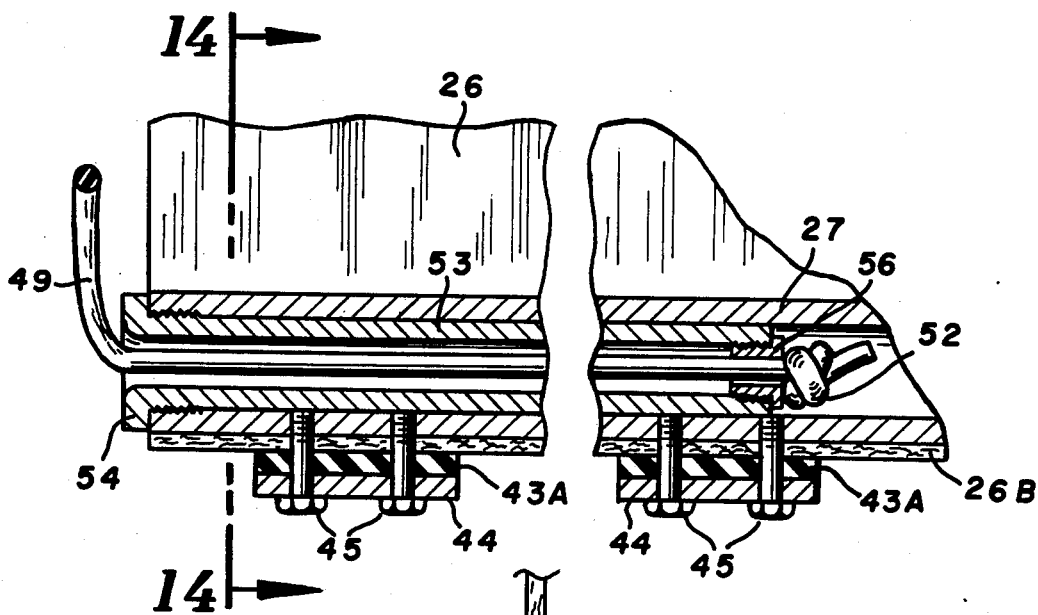
FIG. 13 is a fragmentary vertical longitudinal sectional view of the front end of the roll bar.
Figure 14:
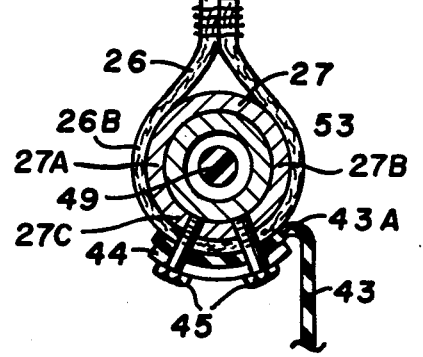
FIG. 14 is a sectional view taken along line 14—14 of FIG. 13.

As shown in FIGS. 8 and 9, a hold bar 41 is connected by a plurality of elongate flexible tension members or elastic straps 43 to the movable longitudinal edge 26B of tarp 26. Bar 41 is a plastic rod reinforced with glass fibers. As shown in FIGS. 13 and 14, each strap 43 has an end 43A covering a portion of movable longitudinal edge 26B of tarp 26 located adjacent roll bar 27. Roll bar 27 is a cylindrical member having a wall with side wall portions 27A and 27B spaced from opposite sides of the longitudinal axis thereof. The wall of roll bar 27 has a bottom portion 27C joined to the side wall portions 27A and 27B and spaced from the longitudinal axis thereof. A C-shaped clip 44 secured by fasteners 45, as bolts or rivets, extended through bottom wall portion 27C of roll bar 27 and tarp 26 secures end 43A of strap 43 to the bottom wall portion 27C of roll bar 27. Clip 44, as shown in FIG. 14, locates vertically depending strap 43 in horizontal offset relation to the longitudinal axis of roll bar 27 and to the vertical depending longitudinal edge of tarp 26 when the tarp is fully unrolled. As shown in FIG. 4, the opposite end 43B of strap 43 is formed into a loop to accommodate a portion of bar 41.

A plurality of anchor brackets 47 are positioned in pairs in longitudinal alignment on sidewall 15 of trailer 11. Brackets 47 are downwardly open hooks positioned for cooperation with bar 41 to secure tarp 26 in the unfurled configuration in covering relation to top opening 14. Hook members 47 are inverted U-shaped hooks secured to the midsection of sidewall 15 with conventional means, as welds, bolts and the like. Hook members 47 are arranged in pairs along the length of sidewall 15. For example, six pairs of hook members 47 can be secured to sidewall 15. Straps 43 are located between each pair of hook members 47.

As tarp 26 is wound and unwound on roll bar 27, straps 43 and bar 41 are also wound and unwound thereon. As tarp 26 is unwound from roll bar 27 over the upper edge 15A of sidewall 15, straps 43 are held in spaced relationship to sidewall 15 such that bar 41 clears hook members 47. When the tarp 26 is fully unwound as shown in FIG. 9, and winding of roll bar 27 is continued in a counterclockwise direction as viewed in FIG. 9, bar 41 is moved inwardly toward wall 15. Continued winding is effective to wind the tarp 26 in an opposite direction on roll bar 27 and lift the bar 41 into engagement with hook members 47. The pairs of hook members 47 serve as guides for straps 43 and retain hold bar 41 in alignment with the hook members 47. In this configuration, the tarp assembly can be locked with tarp 26 firmly in place over top opening 14.

The unwinding of roll bar 27 and tarp 26 is aided with an elongated elastic cord 49. One end 51 of cord 49 is anchored to the front end of sidewall 15. The opposite end 52 of cord 49 is located inside roll bar 27. As shown in FIG. 13, cord 49 extends into a tubular member or pipe 53. Member 53 has a cap 54 attached to the forward end of roll bar 27 to locate pipe 53 within roll bar 27. A plug 56 attached to the inner end of pipe 53 has a hole accommodating the end of cord 49. Cord end 52 engages plug 56. End 52 can be provided with a knot or clamp to retain the end 52 on plug 56. Other means can be used to secure elastic cord 49 to roll bar 27.

Figure 3:
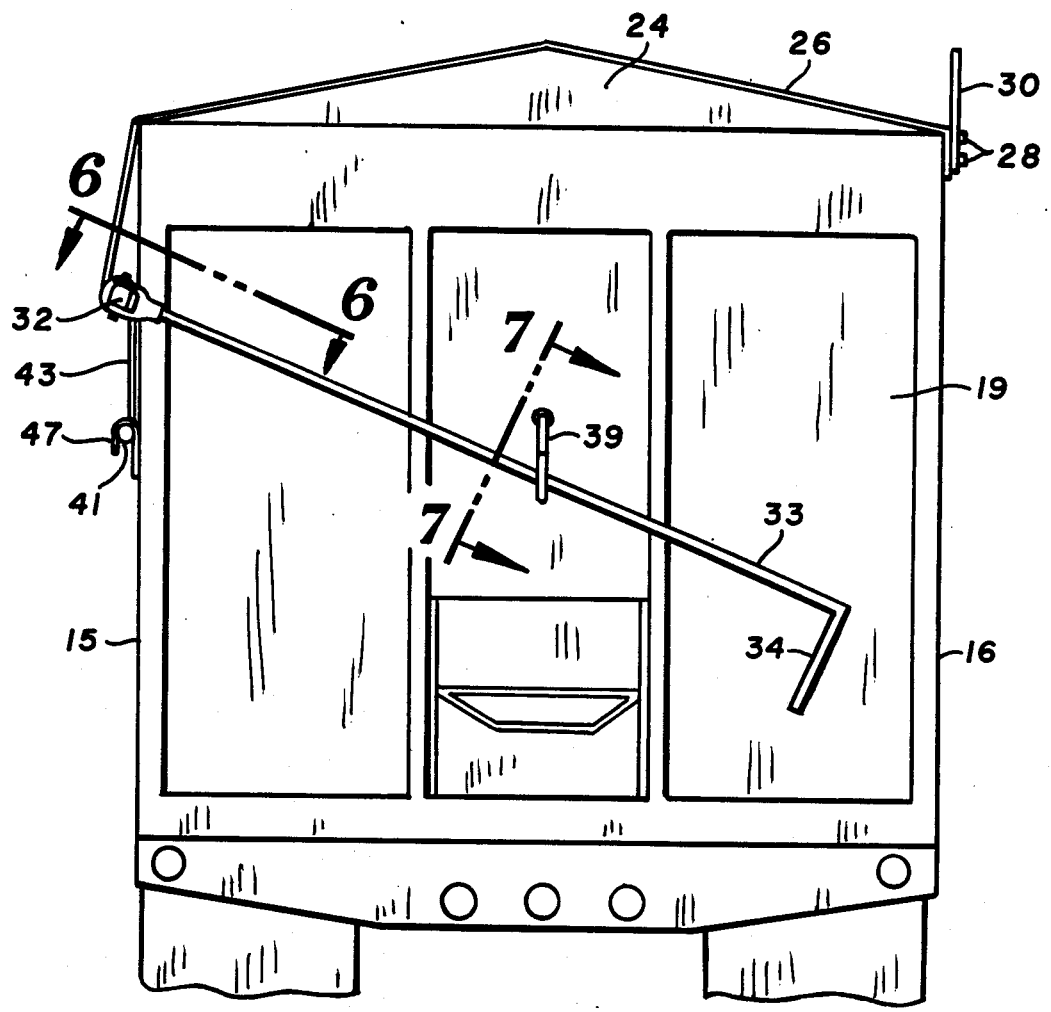
FIG. 3 is an enlarged rear elevational view of the truck trailer of FIG. 2.

In use, tarp assembly 10 is installed in covering relationship to truck trailer 11 as shown in FIGS. 2 to 4. Tarp assembly 10 can be used to cover other open top structures whether fixed or mobile, such as a storage bin, truck box, building or an open top railroad car. As shown in FIG. 4, tarp 26 is reversely rolled onto roll bar 27 to an extent where straps 43 are in tension and hold bar 41 engages hook members 47. Roll bar 27 is locked from rotation by disposing crank rod 33 at a right angle relative thereto and positioning it in hook 39. Tarp 26 is securely in place so as to minimize the possibility of being caught by the wind. The elastic cord 49 is in a contracted configuration with pipe 53.

Figure 10:
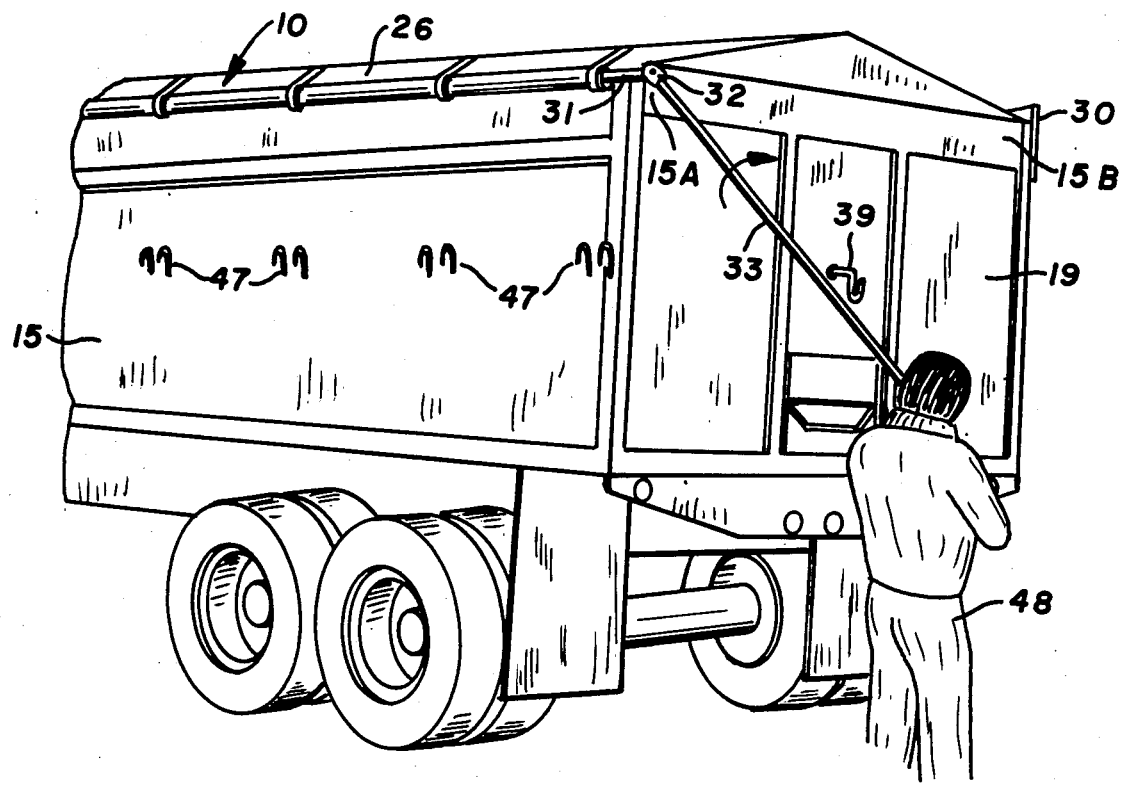
FIG. 10 is a perspective view of a portion of the truck trailer of FIG. 1 at a second intermediate point in the tarp-rolling procedure.
Figure 11:
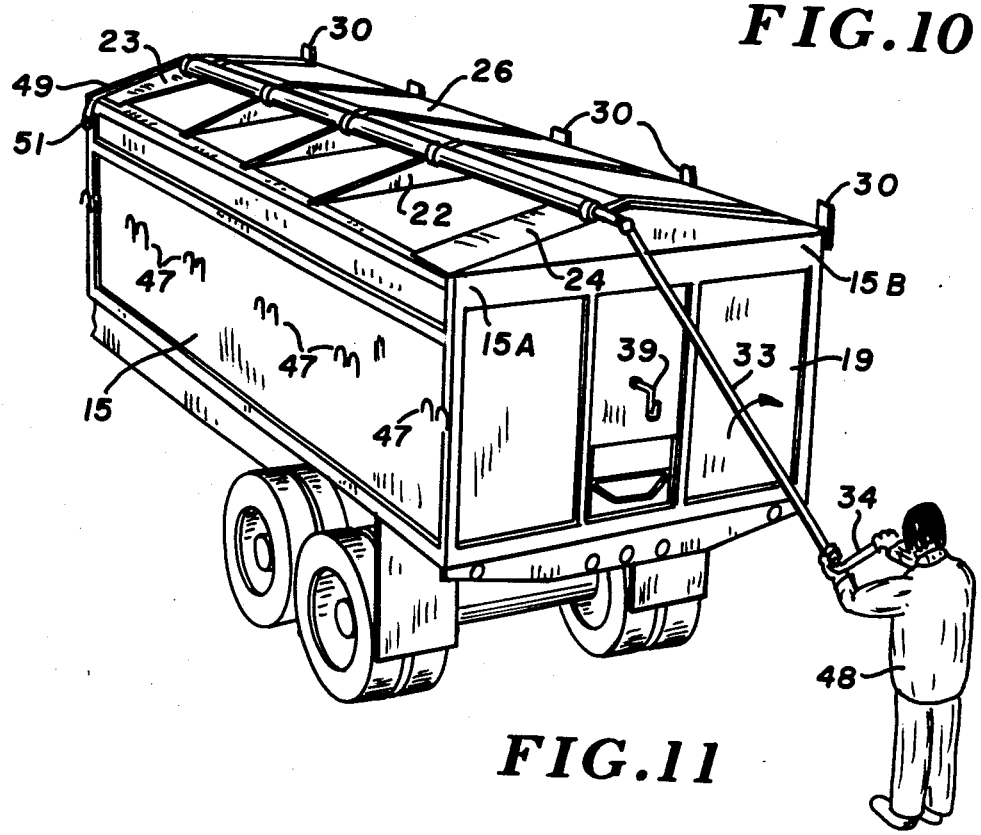
FIG. 11 is a perspective view of a portion of the truck trailer of FIG. 1 with the tarp assembly at a third intermediate point of the tarp-rolling procedure.
Figure 12:
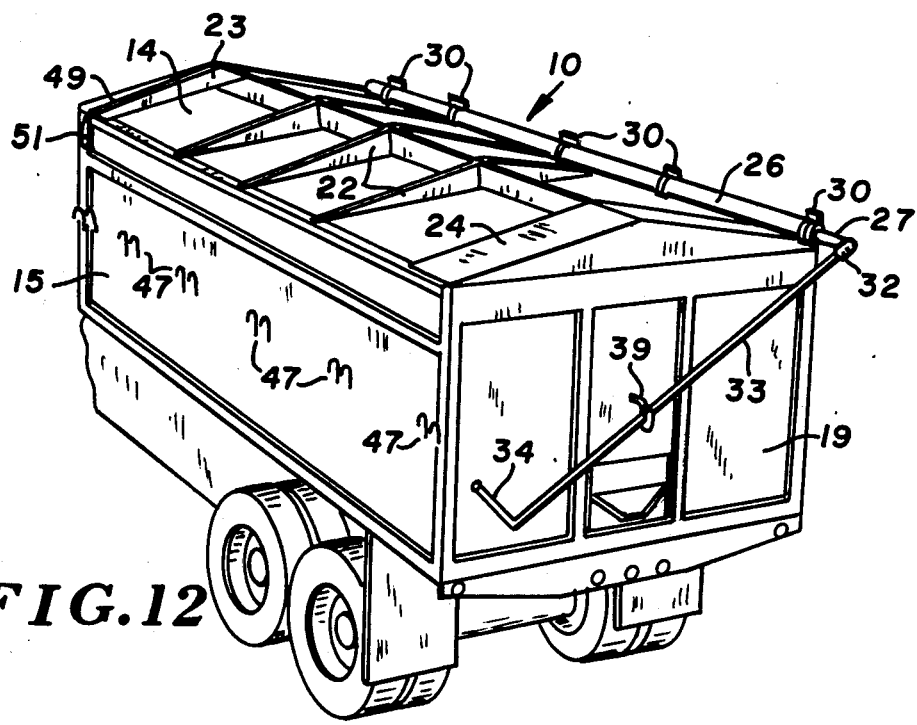
FIG. 12 is a perspective view of a portion of the truck trailer of FIG. 1 with the tarp assembly in a completely furled or rolled configuration and the roll tube and crank rod in fixed position.

Furling tarp 26 to uncover opening 14 is easily accomplished by a single individual. As shown in FIG. 8, the operator 48 standing at ground level releases crank rod 33 from hook 39 and extends it outwardly in a longitudinal direction relative to roll bar 27. The operator 48 then rotates crank rod 33 and roll bar 27 connected thereto in a direction that is clockwise as viewed in FIGS. 9 and 10. Hold bar 41 drops to a position as shown in FIG. 9. Continued winding of the crank rod 33 causes bar 41 to move away from sidewall 15 or from right to left as viewed in FIG. 9 and winding of the tarp 26 onto roll bar 27 is commenced. The hold bar 41 is moved away from sidewall 15 to a position of clearing relationship relative to hook members 47, so that when bar 41 is subsequently raised upon further rotation of roll bar 27, it clears hook members 47. Further rotation of crank rod 33 advances the roll bar 27 from the position of FIG. 9 to a position shown in FIG. 10 wherein it advances over the upper edge 15A of sidewall 15. Further rotation of crank rod 33 in the clockwise direction moves roll bar 27 to a position shown in FIG. 11. The front and rear portions of roll bar 27 and tarp 26 wound thereon are supported on front and rear ramp surfaces 23, 24. The elastic cord 49 is stretched and applies a pulling biasing force on the forward end of roll bar 27. Roll bar 27 is continually rotated in the clockwise direction until the furled configuration of FIG. 12, or open position, is reached with top opening 14 accessible and roll bar 27 with tarp 26 wound thereon resting against stop members 30 adjacent the upper edge of sidewall 16. Continued clockwise turning of crank rod 33 forces the rolled tarp 26 tight against upright stops 30. The elastic cord 49 is in its maximum elongated condition and extends over front end cap 23, as shown in FIG. 12. Crank rod 33 is again disposed at right angles to roll bar 27 and retained in hook 39, whereby rotation of roll bar 27 is prohibited. The rotational biasing force of the rolled tarp 26 holds crank rod 33 in hook 39.

The tarp 26 is unwound from the open position, as shown in FIG. 12, to the closed position, as shown in FIG. 2, as follows. The crank rod 33 is lifted from the hook 39 by the operator. The operator 48 swings the crank arm rearwardly into generally longitudinal alignment with roll bar 27. Crank rod 33 and roll bar 27 connected thereto is then rotated in a counterclockwise direction. This unrolls tarp 26, which is supported on stringers 22 and end caps 23 and 24. The elastic cord 49, being in an elongated tension condition, pulls the forward end of the roll bar toward sidewall 15. The operator 48 continues to rotate the crank rod 33 and roll bar 27 connected thereto in the counterclockwise direction until roll bar 27 and tarp 26 extend down from edge 15A of the box, as shown in FIG. 9. Hold bar 41 is located below hook members 47. Roll bar 27 is above hook members 47. Straps 43 support hold bar 41 adjacent sidewall 15. Continued rotation of crank rod 33 and roll bar 27 connected thereto in the counterclockwise direction causes tarp 26 and straps 43 to roll up on roll bar 27. The hold bar 41 is moved up into engagement with the hook members 47. Crank rod 33 and roll bar 27 are further turned in the counterclockwise direction to tighten the tarp 26 and retain the hold bar 41 in engagement with the hook members 47. Crank rod 33 is then moved adjacent the back wall 19. This turns universal joint 32 to the 90° lock position. Rod 33 is lifted and placed in hook 39. A lock pin (not shown) can be used to retain rod 33 in hook 39.

While there has been shown and illustrated a preferred embodiment of a tarp assembly according to the invention, it is apparent that certain alterations and deviations can be had to the embodiments shown without departing from the scope and spirit of the invention.

The embodiments of the invention in which an exclusive property or privilege is claimed are defined as follows:

1. A tarp assembly for an open top container having a pair of generally parallel, longitudinal first and second side walls with upper edges at least partially defining the top opening of the container, said tarp assembly comprising:

a tarp having a longitudinal dimension longer than the longitudinal dimension of the top opening and a lateral dimension greater than the distance between the container side walls; said tarp having a first longitudinal edge secured to the first side wall and a movable second longitudinal edge extendable in overlapping relationship to the second side wall; first means for securing the first longitudinal edge of the tarp to the first side wall; rigid linear means having a bottom wall portion and side wall portions spaced from a longitudinal axis thereof, second means securing the movable second longitudinal edge of the tarp to a bottom wall portion of the linear means, means for selectively rotating the linear means about the longitudinal axis in a first direction to unroll the tarp from the linear means to cover the open top of the container, rotating the linear means in a second direction to roll up the tarp on the linear means to uncover the open top of the container, said second direction being opposite the first direction, and selectively holding the linear means and tarp rolled thereon in a first position covering the open top of the container and a second position uncovering the open top of the container; hold means fixed to the movable second longitudinal edge of the tarp; said hold means including a longitudinal hold bar, and strap means connected at one end thereof to the hold bar and connected at the other end thereof to the bottom wall portion of the rigid linear means with said second means holding a vertically depending portion of the strap means in horizontal offset relationship to the longitudinal axis and to a vertically depending portion of the tarp when the tarp is fully unrolled; downwardly open hook means adapted to be fixed to an outside surface of the second side wall; said hook means comprising a plurality of hooks longitudinally spaced along the length of the second side wall to guide the strap means and retain the hold bar in alignment for mutual engagement with said hooks, said hooks being positioned in pairs to straddle the strap means when the tarp covers the container opening, said strap means being of sufficient length to position the hold bar beneath the hook means with the rigid linear means above the hook means when the tarp is fully rolled; said hold bar being engageable with said hook means to retain the tarp in the closed position upon continued rolling of the tarp on the linear means in the first direction after the tarp has been fully unrolled, and releasable from the hook means upon unrolling of the tarp from the linear means in the second direction.

2. The tarp assembly of claim 1 wherein: said hook means comprise a plurality of pairs of inverted U-shaped hooks, said pairs of hooks being longitudinally spaced from each other along the length of the second side wall.

3. The tarp assembly of claim 2 wherein: the strap means comprise a plurality of flexible straps, each of said straps being extended between a pair of said hooks when the tarp covers the container top opening.

4. The tarp assembly of claim 1 wherein: the rigid linear means is a longitudinal roll bar extended along the length of the container, and said hold bar being spaced from and extended generally parallel to the roll bar when the tarp covers the container opening.

5. The tarp assembly of claim 4 wherein: the hold bar is an elongated linear rod.

6. The tarp assembly of claim 4 wherein: the strap means comprise a plurality of elongated flexible tension members.

7. The tarp assembly of claim 6 including: a plurality of clips connecting the tension members to the roll bar.

8. The tarp assembly of claim 4 wherein: said hook means comprise a plurality of pairs of inverted U-shaped hooks, said pairs of hooks being longitudinally spaced from each other along the length of the second of said side walls.

9. The tarp assembly of claim 8 wherein: the strap means comprise a plurality of flexible straps, each of said straps being extended between a pair of said hooks when the tarp covers the container opening.

10. A tarp assembly for an open top container having a pair of generally parallel longitudinal first and second upright side walls having upper edges at least partially defining an open top of the container, said tarp assembly comprising:

a tarp having a longitudinal dimension longer than the longitudinal dimension of the top opening of the container and a lateral dimension greater than the distance between the container side walls, said tarp having a first longitudinal edge adapted to be secured to the first side wall and a movable second longitudinal edge extendable in overlapping relationship to the second side wall; first means for securing the first longitudinal edge of the tarp to the first side wall; a roll bar having a generally cylindrical wall having diametrically spaced side wall portions and a longitudinal axis, second means securing the movable edge of the tarp to the wall of the roll bar located adjacent the spaced side wall portions, means for selectively rotating the roll bar in a first direction to unroll the tarp from the roll bar to cover the open top of the container, rotating the roll bar in an opposite second direction to roll up the tarp on the roll bar to uncover the open top of the container, and selectively holding the roll bar and tarp rolled thereon in a first position covering the open top of the container and a second position uncovering the open top of the container; said means for selectively rotating the roll bar and holding the roll bar and tarp in said first and second positions including a manually rotatable crank rod, a universal joint connecting one end of the crank rod to the roll bar, and a crank rod holder connectable to the container to releasably hold the crank rod in perpendicular relationship to the roll bar to locate the universal joint in a perpendicular locking configuration thereby holding the roll bar and tarp in said first and second positions, a hold bar laterally spaced from the roll bar and extended generally parallel thereto, a plurality of strap means connected at one end to the hold bar and connected at the other end proximate a side wall portion of the roll bar, said strap means extended downwardly from the tarp when the tarp is in a fully unrolled position, outwardly and downwardly facing hook means adapted to be attached to the outside of the second side wall, said hook means comprising a plurality of downwardly open hooks longitudinally spaced along the length of the second side wall, said hooks being positioned along the second side wall to guide the strap means and to retain the hold bar in alignment for mutual engagement with the hooks, said strap means being of sufficient length to position the hold bar beneath the hook means with the roll bar located above the hook means when the tarp is fully unrolled over the container with the first edge of the tarp secured to the first longitudinal edge, said hold bar being engageable with the hook means to retain the tarp in the closed position upon rolling of the tarp on the roll bar in the first direction past the fully unrolled position of the tarp, and releasable from said hook means upon unrolling of the tarp from said roll bar.

11. A container and tarp assembly therefore comprising:

container means having a top opening and laterally spaced generally upright walls with upper edges at least partially defining said top opening, a tarp having a first edge, a second edge, and a longitudinal dimension greater than the top opening and a lateral dimension greater than the distance between said walls, means securing the first edge to one of said walls, rigid linear means fixed to the second edge, means for selectively rotating the linear means in a first direction to unroll the tarp from the linear means and rotating the linear means in a second direction to roll the tarp on the linear means, and to hold the linear means and tarp in a position wherein the tarp covers the open top of the container; hold means for releasably connecting the second edge of the tarp to the other of said walls, said hold means including a hold bar, and strap means connecting the hold bar to the rigid linear means, said strap means connected to the linear means in position to extend vertically downwardly from a side of the linear means in offset relation to a vertically depending portion of the tarp when the tarp is fully unrolled, and hook means secured to the other of said walls, said hook means comprising a plurality of downwardly opem hooks longitudinally spaced along the length of the other of said walls, said hooks being positioned in pairs to straddle the strap means when the tarp covers the container opening to guide the strap means and to retain the hold bar in alignment for mutual engagement with the hooks, said strap means being of sufficient length so that the hold bar is engageable with said hook means to retain the tarp in the closed position upon rolling of the tarp on the linear means and releasable from the hook means upon unrolling of the tarp from said linear means.

12. The container and tarp assembly of claim 11 wherein: said hook means comprise a plurality of pairs of inverted U-shaped hooks, said pairs of hooks being longitudinally spaced from each other along the length of the second wall.

13. The container and tarp assembly of claim 12 wherein: the strap means comprise a plurality of flexible straps, each of said straps being extended between a pair of said hooks when the tarp covers the container top opening.

14. The container and tarp assembly of claim 11 wherein: the rigid linear means is a longitudinal roll bar extended along the length of the container, and said hold bar being spaced from and extended generally parallel to the roll bar when the tarp covers the container opening.

15. The container and tarp assembly of claim 14 wherein: the hold bar is an elongated linear rod.

16. The container and tarp assembly of claim 14 wherein: the strap means comprise a plurality of elongated flexible tension members.

17. The container and tarp assembly of claim 16 including: a plurality of clips connecting the tension members to the roll bar.

18. The container and tarp assembly of claim 14 wherein: said hook means comprise a plurality of pairs of inverted U-shaped hooks, said pairs of hooks being longitudinally spaced from each other along the length of the second of said side walls.

19. The container and tarp assembly of claim 18 wherein: the strap means comprise a plurality of flexible straps, each of said straps being extended between a pair of said hooks when tarp covers the container opening.

20. The container and tarp assembly of claim 11 wherein: said means for selectively rotating the linear means and holding the linear means and tarp in a position wherein the tarp covers the open top of the container includes a manually rotatable crank rod, a universal joint connecting one end of the crank rod to the rigid linear means, and a crank rod holder connectable to the container to releasably hold the crank rod in perpendicular relationship to the rigid linear means to locate the universal joint in a perpendicular locking configuration thereby holding the linear means and tarp in a said rolled position wherein the tarp covers the open top of the container.

21. The container and tarp assembly of claim 20 wherein: said crank rod holder is mountable on said container in a position to hold the crank rod in perpendicular relationship to the rigid linear means when the tarp is in either the open position or the closed position relative to the container opening.

22. The container and tarp assembly of claim 11 wherein: the walls are laterally spaced side walls of the container, said means for selectively rotating the linear means being operable to rotate the linear means in a counterclockwise direction to unroll the tarp from the linear means to cover the open top of the container, and rotate the linear means in a clockwise direction to uncover the open top of the container, said linear means being rolled in a counterclockwise direction to roll the tarp on the linear means and move the hold bar into engagement with the hook means thereby holding the tarp in a tight covering relation over the open top of the container.

23. The container and tarp assembly of claim 22 wherein: said means for selectively rotating the linear means and holding the linear means and top in said position wherein the tarp covers the open top of the container includes a manually rotatable crank rod, a universal joint connecting one end of the crank rod to the rigid linear means, and a crank rod holder attached to the container to releasably hold the crank rod in perpendicular relationship to the rigid linear means to locate the universal joint in a perpendicular locking configuration thereby holding the linear means and tarp in said rolled position wherein the tarp covers the open top of the container.

24. A tarp assembly for an open top container having a pair of generally parallel, longitudinal first and second sides with first and second side edges at least partially defining the top opening of the container, said tarp assembly comprising:
a flexible tarp, said tarp adapted to be secured at a first longitudinal side edge thereof to a first side of the container, said tarp having a second longitudinal edge extendable in overlapping relation to the second side of the container, a first rigid linear member attached to the second longitudinal edge of the tarp;
a second rigid linear member located generally parallel to said first member, a plurality of flexible, elongated straps attached to the first member and the second member, said second member being displaced from the second edge of the tarp;
a plurality of inverted U-shaped hooks adapted to be attached to the second side of said container to guide the straps and to retain said second member in alignment for mutual engagement with the hooks when said top opening of the container is closed by said tarp;
crank means attached to one of the members for rolling said one of the members in a first direction to close said top opening of the container with the tarp and in a second direction to uncover said tarp from the top opening of the container;
and holder means connectable to the container to releasably hold the crank means in a position to hold the second member in engagement with the hooks and retain the tarp in position to cover the top opening of the container.

25. The tarp assembly of claim 24 wherein: said crank means includes a universal joint assembly connecting the crank means to said one of the members whereby the crank means can be moved to a position to engage the holder means to thereby hold the second member in engagement with the hooks and retain the tarp in position to cover the top opening of the container.

26. The tarp assembly of claim 24 wherein: said hooks are arranged in pairs in longitudinal alignment along the length of the second side of the container, and a strap is located between each pair of hooks to retain the second member in alignment with the hooks.

27. The tarp assembly of claim 24 wherein: said plurality of inverted U-shaped hooks are located below the second longitudinal side edge of the tarp when extended in overlapping relationship to the second side of the container, said hooks being longitudinally spaced along the length of said second side of said container, an outer surface of the second member being in contact with a surface of said hooks.

28. A container and tarp assembly therefor comprising: container means having a top opening and laterally spaced generally upright first and second walls with upper edges at least partially defining said top opening, a tarp having a first edge, a second edge and a longitudinal dimension greater than the top opening and a lateral dimension greater than the distance between said upright walls, means securing the first edge of the tarp to said first wall of the container, a first elongated linear member attached to the second edge of the tarp, a second elongated linear member laterally spaced from and located generally parallel to the first member, a plurality of flexible elongated straps fixed to the first member and second member, said second member being displaced from the second edge of the tarp when located adjacent the second wall of the container, a plurality of inverted generally U-shaped hooks located longitudinally along and attached to the second wall of the container to guide the straps and retain the second member in alignment for mutual engagement with the hooks when said open top of the container is closed by said tarp, crank means attached to one of the members for selectively rolling said one of the members in a first direction to close said top opening of the container with the tarp and in a second direction to uncover said tarp from said top opening of the container, and holder means mounted on the container to releasably hold the crank means in a position to hold the second member in engagement with the hooks and retain the tarp in position to cover the top opening of the container.

29. The container and tarp assembly of claim 28 wherein: said hooks are arranged in pairs in longitudinal alignment along the length of the second side of the container, and said straps being located between the pairs of hooks to retain the second member in alignment with the hooks.

30. The container and tarp assembly of claim 28 wherein: said crank means includes a universal joint assembly connecting the crank means to said one of the members whereby the crank means can be moved to a position to engage the holder means to thereby hold the second member in engagement with the hooks and retain the tarp in position to cover the top opening of the container.

31. The container and tarp assembly of claim 28 wherein: said plurality of inverted U-shaped hooks are located below the second edge of the tarp when positioned adjacent the second wall of the container, said hooks being longitudinally spaced along the length of the second wall of the container, an outer surface of said second member being in contact with a surface of said hooks.

* * * * *